United States Patent
Anon

(10) Patent No.: US 8,508,622 B1
(45) Date of Patent: Aug. 13, 2013

(54) AUTOMATIC REAL-TIME COMPOSITION FEEDBACK FOR STILL AND VIDEO CAMERAS

(75) Inventor: Josh Anon, Moraga, CA (US)

(73) Assignees: Pixar, Emeryville, CA (US); Disney Enterprises, Inc., Burbank, CA (US)

( * ) Notice: Subject to any disclaimer, the term of this patent is extended or adjusted under 35 U.S.C. 154(b) by 168 days.

(21) Appl. No.: 13/008,855

(22) Filed: Jan. 18, 2011

Related U.S. Application Data

(60) Provisional application No. 61/295,666, filed on Jan. 15, 2010.

(51) Int. Cl.
*H04N 5/76* (2006.01)
*H04N 5/228* (2006.01)
*H04N 5/222* (2006.01)
*G06K 9/62* (2006.01)
*G06K 9/64* (2006.01)

(52) U.S. Cl.
USPC ............. 348/231.99; 348/222.1; 348/333.02; 382/209; 382/217; 382/159

(58) Field of Classification Search
USPC ............... 348/231.99, 222.1, 333.02, 207.99, 348/211.1–211.6, 207.1, 239, 211.99–211.12, 348/220.1; 382/156, 155, 159, 163, 291, 382/215, 217, 209; 396/125, 128
See application file for complete search history.

(56) References Cited

U.S. PATENT DOCUMENTS

| | | | | |
|---|---|---|---|---|
| 6,301,440 B1 * | 10/2001 | Bolle et al. | ..................... | 396/128 |
| 6,516,154 B1 * | 2/2003 | Parulski et al. | ............... | 396/287 |
| 6,816,847 B1 * | 11/2004 | Toyama | .......................... | 706/14 |
| 7,675,635 B2 * | 3/2010 | Tsue et al. | ................... | 358/1.13 |
| 2001/0048815 A1 * | 12/2001 | Nakajima et al. | ............. | 396/310 |
| 2005/0200722 A1 * | 9/2005 | Ono | .......................... | 348/222.1 |
| 2009/0278958 A1 * | 11/2009 | Bregman-Amitai et al. | ....................... | 348/231.99 |

FOREIGN PATENT DOCUMENTS

JP 2002185846 A * 6/2002

* cited by examiner

*Primary Examiner* — Nhan T Tran
*Assistant Examiner* — Marly Camargo
(74) *Attorney, Agent, or Firm* — Kilpatrick Townsend & Stockton, LLP

(57) ABSTRACT

An image capturing device includes an image sensing device, a processor, and a memory. Using this, the device can determine a plurality of image-based characteristics for a proposed image, compute a composition measure for the proposed image and the given settings that depends from at least two of the plurality of image-based characteristics of the proposed image, output an indication of the composition measure to a user, in the form of simple indicators, more complex indicators/displays, and/or provide suggestions for altering at least one characteristic of the proposed image or data about the context of a shot, receive an image capture signal from the user in response to the indication, receive a captured image from the image sensing device in response to the image capture signal, and store the captured image in memory. The feedback can also be provided at a later time.

10 Claims, 2 Drawing Sheets

AUTOMATIC REAL-TIME COMPOSITION FEEDBACK FOR STILL AND VIDEO CAMERAS

CROSS-REFERENCE TO RELATED CASES

This application claims the benefit, and is a non-provisional application, of U.S. Provisional Patent Application No. 61/295,666 filed on Jan. 15, 2010, which is incorporated by reference in its entirety for all purposes.

FIELD OF THE INVENTION

The present invention relates in general to tools provided to image and video takers to improve results of their image or video compositions and more particularly to real-time analysis and recommendations.

BACKGROUND

With the advent of relatively inexpensive image, audio and video capture devices, whether they are dedicated devices, such as cameras, or integrated devices, such as still/video camera features of mobile telephones, etc., there has been more expectation of being able to take photographs and video at many more locations by many more people. Cameras are simple to use without extensive training and inexpensive to generate photos (perhaps even close to costless, in the case of digital photography), and as a result, most people do not consider it a requirement that they take courses in photography or learn darkroom skills—or even read a user manual for a camera—before they begin to take pictures.

While some of the shortcomings of the ability of one to take good (i.e., aesthetically pleasing) photographs can be overcome by just having the user take many more pictures than are needed and leave the sorting for later, this is not necessarily a solution in all cases, as that requires additional memory storage, requires the subjects of the photographs to pose for longer and might not even provide anything desirable photographs in the end.

To be sure, there are currently available cameras that improve some aspects of photography for the amateur. For example, most cameras can analyze an image and automatically focus the lens, so that the user is freed from having to estimate distances or manually set the focus. Most cameras can also set the shutter speed appropriately for a given amount of light that is falling on the camera. Some cameras can even detect smiles (or more precisely, the lack of smiles) and closed eyes to control when to take a photograph.

In general, cameras often have various settings and programming to optimize each of those settings, i.e., getting the ideal focus, the ideal aperture, the ideal number of smiles, etc. However, as professional photographers know, a pleasing image is often not simply obtained by optimizing each characteristic (e.g., camera setting).

BRIEF SUMMARY

In using an image capturing device including an image sensing device, a processor, and a memory, a photographer or videographer might have the image sensing device receive a proposed image (e.g., image cast into a CCD that might also be presented in a digital view finder), determine a plurality of image-based characteristics for the proposed image, compute a composition measure for the proposed image and the given settings that depends from at least two of the plurality of image-based characteristics of the proposed image, output an indication of the composition measure to a user, in the form of simple indicators, more complex indicators/displays, and/or provide suggestions for altering at least one characteristic of the proposed image or data about the context of a shot, receive an image capture signal from the user in response to the indication, receive a captured image from the image sensing device in response to the image capture signal, and store the captured image in memory.

In some variations, the plurality of image-based characteristics include a color characteristic, a focus characteristic, a brightness characteristic, etc. Some of those image-based characteristics might, when considered collectively, contribute to a measure of an image's overall "energy" or visual intensity, as typically perceived. Images with extremely high or low energy are often not pleasing.

In some variations, the composition measure is computed while taking into account external characteristics that are treated as independent of the pixel color values of the proposed image, such as geographic location of the image capturing device, a time of day, a classification or preference obtained from the user, and/or a data structure representing rules that embody cultural preferences. Some external characteristics might comprise distillations of factors from a training set of photographs, wherein at least some plurality of the training set of photographs have associated therewith a rating and one of the external characteristics is an estimated measure of rating that would be applied to the proposed image given the training set and their ratings.

In some variations, the indication comprises a set of different colored lights, or a display element capable of conveying a range for the composition measure, an audio signal or a tactile signal. In some variations, suggestions are provided to signal to the user changes that could improve the composition measure, including one or more of icons, arrows or indicators for some change, some indication that the image capturing device will automatically make the change, and/or some language indicator explaining suggestions to the user in a visual, audio and/or tactile display of the image capturing device. In some instances, the indication is presented by templates, or samples, wherein the user is provided with example images that have high composition measures, possibly also in context (i.e., when the camera determines that the user is attempting a desert landscape image capture, present known good template images of desert landscapes).

In yet another variation, a plurality of images already captured are presented to an engine that computes the composition measures for those images for post-capture processing, such as sorting, ranking and/or filtering images.

The following detailed description together with the accompanying drawings will provide a better understanding of the nature and advantages of the present invention.

DETAILED DESCRIPTION

Figure 1:
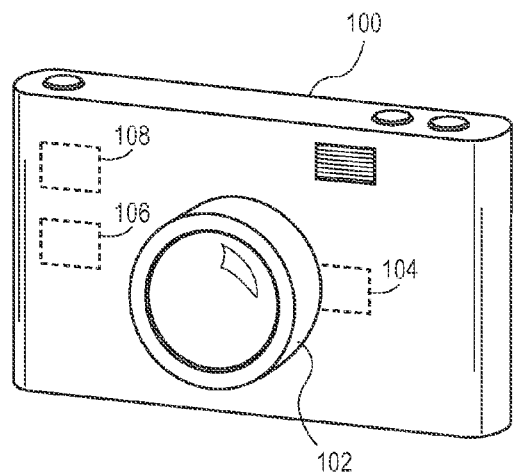
FIG. 1 illustrates a camera according to embodiments of the present invention.

An improved composition and recommendation method and apparatus are described herein. Using this, a photographer (or videographer) is provided signals or indications of a likely quality of a composition and/or recommendations for improvement usable while the image or video is being taken. For clarity, the examples below will refer to a photographer taking an image and not repeatedly to a photographer taking an image and/or a videographer capturing a video sequence, but it should be understood that, unless otherwise indicated, what is explained about a photographer using a camera to capture a photograph can equally apply, unless otherwise indicated, to a videographer using a video camera to capture a video sequence, or possibly also 3D photography and 3d videography. Additionally, while many of the examples assume digital capture of images onto memory or other digital storage, the examples herein might also apply to devices that ultimately capture onto film or analog media.

In a typical operation, the photographer uses a device that is either a camera (e.g., point-and-shoot, DSLR, SLR) or a multi-purpose device that includes a camera (such as a mobile telephone with a camera) to stage a shot (e.g., positioning the camera, changing settings, positioning the subject(s) of the shot) and then capturing the image. This might be done more than once in quick succession, as is typical in a professional photo shoot having time constraints. Using embodiments of the present invention, the photographer is provided with real-time feedback as to composition and recommendations, or can be provided with such feedback after the fact to assist with learning for future photography projects.

In a very specific example, the camera viewfinder might have three lights (e.g., red, yellow, green) to signal to the photographer a rating of the photograph that would result if a photograph was taken at that time, with those settings, in that location. The photographer might, seeing a red light, move the camera or make other adjustments to see if a yellow or green light could be obtained. In other embodiments, the camera might provide more detailed feedback, such as "You're about to capture an image of what appears to be two people. The person on the left is not facing the camera and there appears to be a large, thin vertical structure directly behind the person on the right. Have the person on the left look towards the camera and move to the left or right so that it does not appear that the person on the right has something growing from their head."

A composition and feedback process, or "engine", might be implemented on the camera, in software, hardware or some combination, but might also be implemented off of the camera, also in software, hardware or some combination. In the latter instance, the off-camera processing might be used only for post-session suggestions for improving future photographs, but where the camera is network-connected, or otherwise wired or wirelessly connected or coupled to the engine, the feedback can be provided as the photographer is taking photographs.

The inputs that the engine has to work with can include image inputs, such as the values of the pixels currently being sensed by a charge-coupled diode array of the camera, higher-level aspects of the image being sensed (e.g., the lack of sharp edges that might indicate a lack of appropriate focus), as well as camera settings (F-stop, aperture, shutter speed, film speed, detectors, color optimizers, etc.). In addition to these intrinsic camera inputs, the engine might work with camera-specific, photographer-specific, or cultural-specific external inputs. Other inputs might include an indication of where in the image the subject is (e.g., find faces and draw a rectangle around the most prominent face in the image, find an object with a defined border that has a color distribution that is wildly different from the histogram of the rest of the image, as might be the case when photographing a red and yellow bird with a background of green and brown of the surrounding trees). This input can be used to influence how various characteristics are weighted.

Another input that is obtained from the image, so it is an image input, but perhaps not one easily measured by considering pixel color values in isolation, is an "energy" measure of the image. It is generally understood that pictures with bright colors are more "energetic" than pictures with muted tones. It is also generally understood that vertical lines are low energy, horizontal lines are higher in energy and diagonal lines convey the most energy, while reds, oranges and yellows are more energetic than greens, blues, browns, etc. Taken alone, there might be an optimal energy measure and certain adjustments might be suggested, such as a suggestion to zoom in to eliminate more low energy background, thereby increasing the energy of the image. However, a lower, or less optimal, energy level might be appropriate when, for example, the engine determines that the nature of the photograph being proposed is better composed when there is less energy in the image, as might be the case for example, with a photograph of a graveyard that is preferred to be shot with low energy relative to other photographs, such as a shot of children playing.

Camera-specific external inputs might include the camera's current geographic location, time of day, orientation and the like. These external inputs might actually be provided by circuits and/or sensors inside the camera (such as an internal real-time clock) or in combination with other systems (such as a GPS receiver that receives GPS satellite signals in order to determine a location of the camera), a compass and accelerometer for orientation, etc. This would allow the engine to make recommendations for composition given certain locations.

Photographer-specific external inputs might include the set of all photographs in a training set that the photographer indicated as being aesthetically pleasing. In such cases, it is not likely that the camera itself would store all of those training photographs, but an external engine might operate with server capacity or storage capacity to pre-analyze a set of training photographs and use that to evaluate a potential photograph.

Cultural-specific external inputs provide for aesthetics that can vary. For example, there might be some cultures for which different colors have different meanings and some color combinations conflict, whereas in other cultures, the colors combinations are seen as harmonious. In such cases, the engine might send a signal or a message when the processing performed by the engine suggests that the colors seen in the potential photograph are too "energetic" when it takes into account that there are also many lines in the image and takes into account a set of cultural-specific external inputs.

The external inputs might be represented by data structures stored and accessible to the engine. For example, a data-set mapping color combinations to energy values for various culture settings might be used.

Many photographers are people who own image capturing devices and are considered amateur photographers, and they often unknowingly take poorly composed photos. For example, such photographers often place subjects in the dead center of the captured image, and do not consider energy levels that colors, lines and other image features convey. Some cameras might provide guides on a viewfinder to, for example, divide the image into a three-by-three array so that the photographer can position one of the subjects at one of the corners formed by that array (i.e., follow the "rule of thirds"). However, that is not always ideal. For example, when taking a picture of children in front of a castle at Disneyland, it might be preferred to center the image on the castle rather than position the children at the "power point" given by the rule of thirds. Thus, if the engine is aware of the camera location and has access to a data set of rules (e.g., "when located at the GPS coordinates of the front of Cinderella's Castle™ in Disneyland, suggest centering on the castle rather than rule of thirds"). A more general rule might be to suggest the appropriate balance between the amount of land, sky and water when taking a photograph at a coastline at the time of sunrise or sundown. An even more general rule might be to suggest that where there are large numbers of diagonal lines—suggesting energy—that the colors be toned down to not overwhelm the viewer. For example, if the image has a considerable number of diagonal lines and also has bright colors (both of which might raise the energy), the engine might suggest centering the subject, because that is a lower energy position than a rule of thirds point. That could help not overwhelm the viewer. There are other examples of where the interplay of different characteristics might suggest going against (even going in opposite directions) for individual characteristics. In other words, a camera using such an engine might work to balance components and characteristics using what is in the proposed image and higher-level info, such as location and position, instead of just optimizing a set of low-level components each towards an ideal for that component.

A typical composition and feedback engine, according to embodiments of the present invention, will consider more than one independent value for some characteristic of an image and provide recommendations that might not be optimal for one characteristic versus another characteristic. For example, one of the rules of composition might be that there is a specific ideal level of color variation, wherein a photograph with bright and varying colors is deemed better composed than one with more muted colors without much variation. However, where one of the other characteristics of the photograph is the nature of strong lines in the photograph—for example, where there are many diagonal lines rather than a few vertical lines or horizontal lines—a less than optimal (when considered alone) color variation measure works better with those lines. In mathematical terms, if each characteristic is an axis in an n-dimensional space and the values assigned to each of the characteristics define a point in the n-dimensional space for a given image and an overall composition measure for the image, there might be global maxima that is higher than any maxima along the axes and the coordinates for the global maxima might be different than the coordinates along any one axis. Continuing this example, the camera can just provide a rough indication (red, yellow, and green) of the value at the current location in the n-dimensional space, but might also provide "arrows" to indicate how to "walk" to a higher location.

Example Systems

FIG. 1 illustrates an example camera 100 with a composition and feedback engine. As illustrated there, light passing through lens 102 impinges on CCD 104 to form a digital, electronically readable image. Camera 100 is equipped with a processor 106 may include memory for variable storage and/or programming instructions storage (not shown) and a composition and feedback engine ("engine") 108. Processor 106 might be used to manage adjusting camera settings, responding to user inputs, and other conventional camera operations. Engine 108 might be coupled to processor 106 to alter how processor 106 manages its inputs and provide outputs for the photographer. Photographer outputs may include audio elements (e.g., beeping to indicate composition measure), simple visual elements to represent the composition measure, such as an indicator, a scale, a meter, display the numerical value, etc., or a more complex output, such as a display of suggestions for changes to settings or other elements to improve the composition measure, or an overriding of camera controls based on composition measure (e.g., if the composition measure is below a threshold, the camera might lock the shutter button to prevent a photograph from being taken. Suggestions might be presented in a viewfinder display (not shown).

Figure 2:
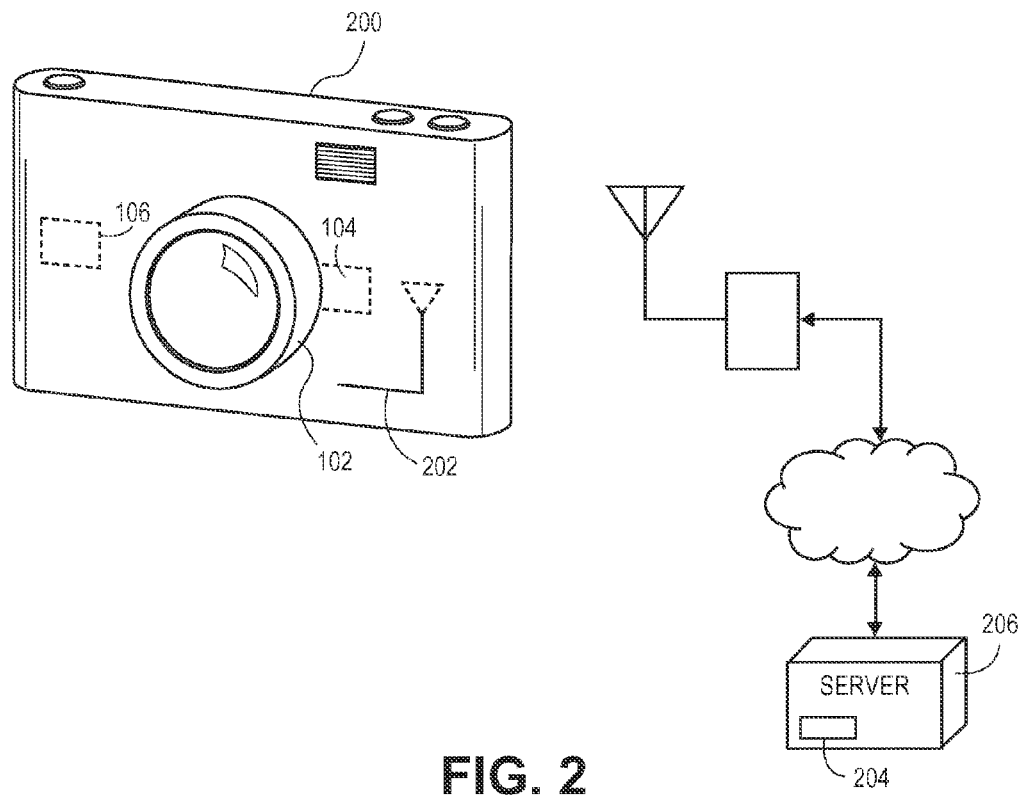
FIG. 2 illustrates a camera according to embodiments of the present invention where a composition and feedback engine is provided remotely.

FIG. 2 illustrates a variation wherein camera 200 does not include an internal composition and feedback engine, but includes a wireless data connection via antenna 202. In this configuration, a composition and feedback engine 204 is coupled to camera 200 via a wireless connection to a wireless router that is in turn connected over a network to a server 206.

Unless otherwise indicated, many of the examples of the operation, features and capabilities of a composition and feedback engine described herein could apply to be internal version or the external version, however it is often the case that more functionality and data storage can be provided in a less portable environment, in which case camera 200 might be able to perform additional functions. For example, it might not be feasible to store thousands and thousands of previously captured photographs on the camera, whereas it would be a simple matter to store those on a server so that the engine could, for example, analyze a large number of photographs previously taken by the photographer and use that information for generating a talk addition measure. This might be useful when a large body of photographs that are rated for aesthetics and can be used as a training set for a fuzzy logic process.

Figure 3:
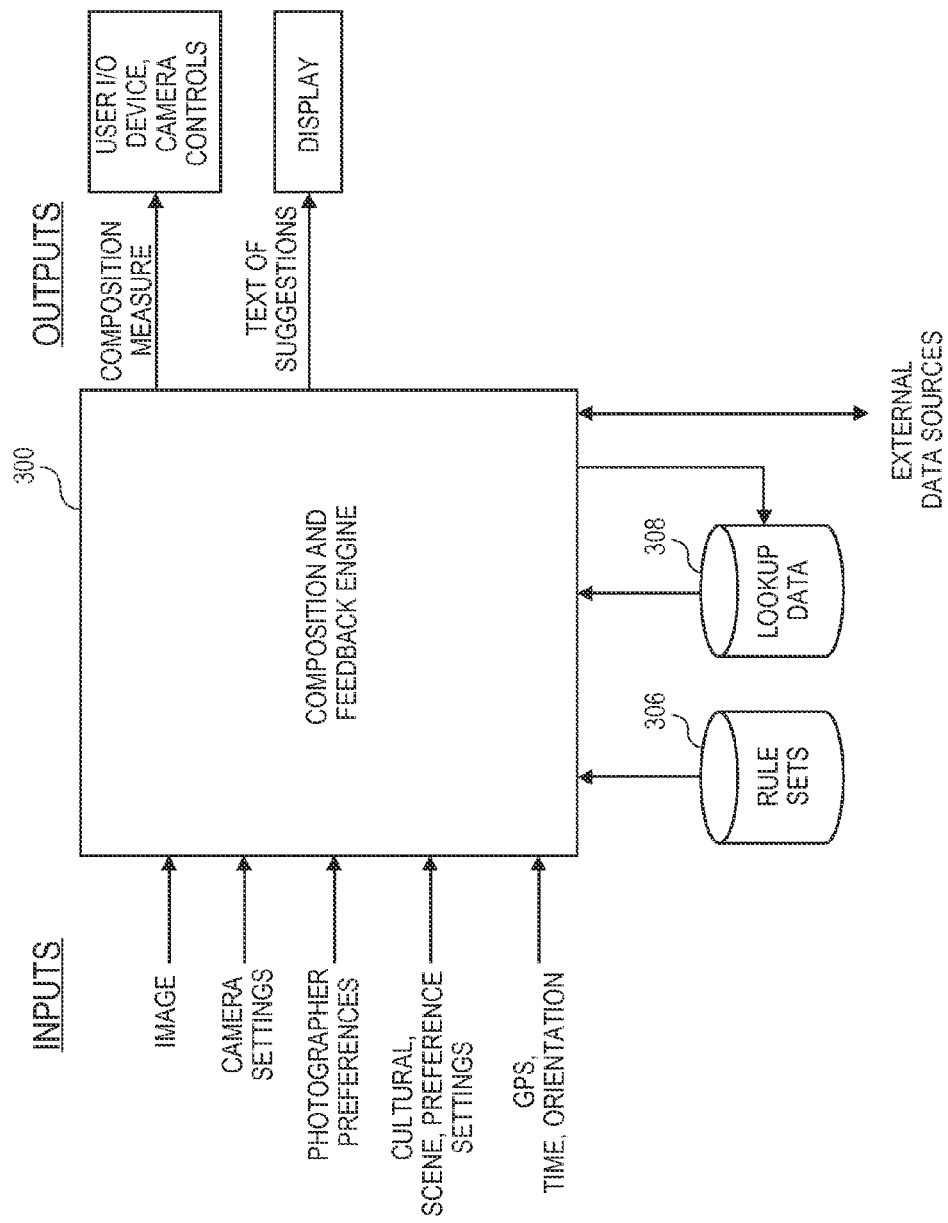
FIG. 3 illustrates a composition and feedback engine.

FIG. 3 illustrates a composition and feedback engine or 100 having various inputs and outputs. Details of the various modules and components of engine 300 are not explicitly shown, but it should be understood that features, elements, capabilities and functionality of engine 300 described herein could be implemented as special-purpose hardware elements, software elements executed on a processor (not shown) or other known the methods of implementing computational capability.

As illustrated, engine 300 outputs a composition measure, which provides rating of the composition of an image that is a "proposed" image not yet captured by the camera, but visible through the lens. The measure is provided to user input output devices or elements, as explained elsewhere herein or to camera controls, as appropriate. Engine 300 can also output text (or possibly other formats) of suggestions to be provided to a display to allow the photographer to make adjustments based on those suggestions prior to capturing an image.

In addition to a simple indicator and text or iconic suggestions, engine 300 might also select template or sample known good images applicable to a context (as determined from the engine's inputs) for presentation to the user. Thus, the indication can be a set of images or templates that have high composition measures, possibly also in context (i.e., when the camera determines that the user is attempting a desert landscape image capture, present known good template images of desert landscapes). Suppose the user is aiming a camera at what engine 300 detects is a picture of a desert landscape with too much sand and not enough sky. The engine could detect "desert" and "landscape" (perhaps by image characteristics, or perhaps by GPS coordinates of the camera, or because the user set the camera to a "landscape" mode and a "desert" sub-mode) and then present several pictures of desert landscapes, presumable with good sand/sky balance, which might trigger the user to adjust the camera for a better balance. Of course, if the user is perhaps a geologist and wants only a picture of the sand and rocks, the engine would not prevent that.

As shown, some of the inputs to engine 300 include the image itself, camera settings, photographer preferences, various settings for cultural preferences, scene preferences and the like, as well as location, time, orientation inputs. An example of a cultural preference setting is to allow the photographer to select a context for an aesthetic measure, so that instead of attempting to provide a measure of some universal aesthetic, the engine can provide a measure of an aesthetic based on Japanese aesthetics, Chinese aesthetics, maritime aesthetics, mountaineering aesthetics, children aesthetics, urban aesthetics, etc.

Engine 300 can also take into account rule sets stored in rule set storage 306 and lookup data stored in lookup data storage 308. Examples of rules are used throughout this disclosure, and it should be understood that engine 300 operates on data structures that represent those rules, possibly in combination with lookup data 308 that may be relevant to a particular rule. For example, a rule in rule set storage 306 might indicate that for landscape images of large bodies of water, adjust the camera settings so that a pleasing amount of light would come from the water relative to the sky, and another rule in rule set storage 306 might indicate that when standing close to a famous monument, suggest to the photographer where good viewing locations are, and the lookup data 308 might include data for some commonly widely photographed monuments.

Of course, a knowledgeable or avant garde photographer might choose to purposefully go against the suggestions, but the suggestions are typically geared to amateur photographers that would like to take photographs that are more pleasing (to the photographer and/or to a general viewing audience), but is not sure how to go about doing that. For example, where the photographer is a real estate agent taking pictures for a sales brochure, rules and suggestions that guide the real estate agent to taking pictures that rate high on a "real estate aesthetic" might feel overly constraining to a gallery artist but would be much appreciated by someone wanting to quickly take pleasing pictures of a property.

Examples of Uses

Given the above-described components, there are many uses for a camera with such an engine. For example, a camera image type setting might be set to a "portrait image" mode, an image capture device (or the engine itself) might identify the head and/or eyes of the subject to be photographed, the engine would then consider the image type setting, the current lens aperture, etc. and suggest movement or recomposition based on one or more rules from the rule set. In another example, the engine might consider that the mode is set to "landscape image" mode, the focal-length of the lens, and the horizon line of in the image itself and, based on one or more rules, suggest changes.

As explained, the feedback can be a simple visual, audio or vibratory indication of the composition measure, but might also include suggestions for improvement, in the form of arrows, icons, text, etc. Of course, with real-time feedback, the simple indication can work as a suggestion—if the photographer pans the camera up and down and watches the indicator change in real-time, that can get to the same result as a display of the text "rotate the camera up to capture more of the sky" or the like.

In response to real-time feedback from the engine, it is expected that the photographer would change the settings of the camera (or agree to allow the engine to change them), e.g., change the focal-length of the lens, change the aperture of the lens, change the shutter speed, change the photographic mode (e.g., "portrait" to "landscape," "night-photo" setting to "beach" setting), or the like. In such embodiments, as the user modifies the camera's settings, the indicator should also change (e.g. red to green, yellow to green, vibrate to no-vibrate, yellow to red, etc.), based upon the modified camera parameters. In various embodiments, once the photographer is satisfied with the judged camera settings, the photographer may press the shutter to capture an image. In various embodiments, the camera may or may not inhibit the taking of a digital photograph based upon the adjudged composition/camera settings. Other suggestions might be to move or reorient the camera.

Measuring Composition

As mentioned above, the characteristics that are used to judge a properly composed image often depend upon the type of image that is sought to be captured. In other words, the characteristics that define what is "a good image" are highly dependent upon the photographer's intent. For example, if a photographer is taking a picture of a person in front of an object, such as the Eiffel Tower, a "good" shot is typically judged when the Eiffel Tower is positioned to not be directly behind the subject's head (so that it doesn't appear to be growing out of the subject), the subject is in focus, the subject's eyes are open, and the energy of the light, color, lines, and subject's position are in a middle range (so the image is not flat and boring or overwhelmingly detailed). In such embodiments, parameters from the camera may be used to make the judgment, such as the orientation of the camera, where the camera is focused-upon, where within the scene is a face recognized, and the like.

In various embodiments, these parameters may be input into a fuzzy logic set, or the like, and an evaluation, e.g. weighted, combination of parameters may be performed by the composition and feedback engine.

Another example of "good image" characteristic being based upon photographer's intent is with landscape photography. In such embodiments, parameters from the camera might be characteristics that are used to make the judgment, such as the orientation of the camera, the energy components of an image such as the lighting contrast, color contrast, shape contrast, detail, in-focus area placement, etc., and other components such as aperture, ASA, or the like.

In various embodiments, the engine might execute a learning process based on a training set of pre-determined "good" photographs. This training set might be determined by professional photographers and the process distilled to a set of rules or the coding of a neural network or fuzzy logic set. For cultural preference training sets, professional photographers from Japan might be consulted and photographers from Europe as well, while cameras for the Japanese market might use the Japanese aesthetic training set, while the cameras to be marketed in Europe might use the European training set. Some cameras might have more than one.

In still other embodiments, a camera manufacturer might provide the photographer with a training program, and/or training images, or the like, so that the photographer can customize the automatic composition judging algorithm to reflect the photographer's specific taste. For example, if the training set comprises 100 photographs and the particular photographer rates each of those on an aesthetic scale of their own choosing, the engine can use that training set to determine a composition measure for other photographs the photographer is about to take.

In other embodiments, location of the photograph may also be used to aid in composition suggestions. For example, if the camera is able to determine its location and orientation of the camera, the automatic composition system could be even more effective by looking up information and using information about that location. Such data may be provided based upon conventional tools such as GPS coordinates, manual input, or the like. As an example, a great spot to take a photo of kids at Disneyland might be in front of the castle. Previously, Disney may have hired a professional photographer to determine information about where the best spots are to stand (depending on time of day of course), where to aim the camera, how to arrange the people in the photo, or the like. Based upon the provided information, the camera will "coach" the photographer on how to compose a good photograph by providing suggestions. In alternative embodiments, such information may be previously provided and stored on the camera, e.g. internal memory, downloaded onto SD card, CF card, etc. In such embodiments, when the photographer goes to take the picture, the camera may do more than simply provide a red/yellow/green light. Instead, the camera may suggest where the faces are within the image, suggest that the user zoom-in or out from the subjects, suggest that the user shift left or right (e.g., via arrows), or the like. The camera might even show an example or template image having similar characteristics to what the photographer is shooting to give ideas on improving the photograph.

Quite often, it might be the case that the composition measure that is arrived at is at a high value even while the values at each of the individual characteristics might not be as high as for other settings for the characteristics. For example, the engine might optimize a suggestion for changing a camera location to one where the color mix is less desirable, but where the composition is better. It may even be the case in some situations where all of the individual characteristics go down and the overall composition measure goes up.

As explained above, a composition engine gets information about a proposed image (or an already taken image) and other information in context and provides feedback to the user to allow the user to decide whether to take (or keep) the shot or whether and how to modify the shot prior to taking it. Context is useful for suggestions, since parameters for what would be a good shot might vary between, say, a Disney theme park, rural Montana, or a snow covered peak, as well as varying by location, orientation of the camera, time of day, etc. In some cases, where there are sample good images in context to show, those can be shown, or just general templates can be shown or used. For example, in a remote grassland, sample "good" images might not be available, but one of the stored rules might be that when the camera is in a "landscape" mode, check the sky-to-land ratio and if the sky takes up too much of the frame, suggest aiming the camera lower. The composition engine could adjust this rule based on its analysis of the scene, however, so that if there is a high level of color and shape contrast in the sky, indicating an interesting sunset or clouds, the composition engine will suggest showing more of the sky than if the sky is just solid blue.

In some cases, such as a purely abstract shot, many of the rules will have to be discarded or not considered and the engine can simply consider an overall measure of the energy (or visual intensity) of the proposed image based on low-level characteristics of the proposed image. A preference can be trained (along with how each characteristic contributes to energy), but in general, low-energy images are boring to look at and high-energy images are overwhelming to look at.

As a fall-back, of course, the camera can just default to optimizing low-level characteristics (e.g., light, focus, aperture, depth of field, etc.) each separately when there is not enough information to work with.

Post-Capture Composition and Feedback Engine

A similar engine can be provided that is run after the fact, i.e., not in real-time—not in sufficient time to allow the photographer to adjust the shot. While it might be possible to restage the entire shot at a later date, it is assumed in these examples that the post-capture engine in these examples is used for post-processing and as a teaching tool.

As post-processing, the engine might provide a filter to provide suggestions for images from a large body of images that are the more aesthetic images. For example, a photographer might dislike the task of going through hundreds of photos to decide which to keep or which few to include in an electronic photo album. In one embodiment, a user may direct the automatic selection of images to be placed within an album. Such selection may be based upon the above-described composition judging techniques. For example, images judged to have good or acceptable composition may be placed in a "to be reviewed first" album, thus enabling the photographer, or other viewer to quickly identify images that may be valuable or significant.

The system may also use geographic information to determine the location of the photograph. Based upon such information, the software may be able to determine which of the taken images are judged closest to "good" and thus suggest photographs that should be reviewed.

Video Implementations

Where video inputs are considered, many of the same considerations for framing might be used, but there can be additional, video-specific considerations. For example, the video camera might include a motion sensor that can provide the engine with inputs as to how the camera is moving. For example, it might be a preference when a subject is moving quickly in a scene to frame more of the scene in front of the subject than in back of the subject and this could be suggested by the engine to a videographer. Since the engine optimizes over a plurality of characteristics, the outcome might be different than if each of the characteristics were optimized separately. For example, if a scene contains bright and dark areas that are moving rapidly, optimizing for just the ideal overall brightness might provide recommendations that would provide a jarring movement of the video camera. Likewise, a "rule of thirds" optimization alone might provide too much variation of luminance for comfort. Instead, the engine considers each of the characteristics and attempts to optimize a composition measure that may in fact choose suboptimal values for the individual characteristics.

Variations

In various embodiments, what characteristics are used to determine what is a "good" image are very flexible and can be enhanced or changed completely over time.

Further embodiments can be envisioned to one of ordinary skill in the art after reading this disclosure. In other embodiments, combinations or sub-combinations of the above disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. A method for operating an image capturing device, the image capturing device including an image sensing device, a processor, and a memory, the method comprising:
receiving a proposed image from the image sensing device;
determining a plurality of image-based characteristics, using the processor, in response to the proposed image;
computing a composition measure for the proposed image and given settings, using the processor, wherein the composition measure depends from at least two of the plurality of image-based characteristics of the proposed image, wherein computing the composition measure includes taking into account external characteristics that are treated as independent of pixel color values of the proposed image, and wherein the external characteristics comprise distillations of factors from a training set of photographs, and wherein at least some plurality of the training set of photographs have associated therewith a rating and one of the external characteristics is an estimated measure of the rating that would be applied to the proposed image given the training set and their ratings;
outputting an indication of the composition measure to a user associated with the image capturing device;
receiving an image capture signal from the user in response to the indication;
receiving a captured image from the image sensing device in response to the image capture signal; and
storing the captured image in the memory.

2. The method of claim 1, wherein the plurality of image-based characteristics include a color characteristic, a focus characteristic, a brightness characteristic and an energy characteristic.

3. The method of claim 1, wherein external characteristics comprise one or more of a geographic location of the image capturing device, a time of day, a classification or preference obtained from the user, and/or a data structure representing rules that embody cultural preferences.

4. The method of claim 1, wherein the indication of the composition measure is one or more of a set of different colored lights viewable on the image capturing device, a display element capable of conveying a range for the composition measure, an audio signal or a tactile signal.

5. The method of claim 1, further comprising:
determining image features to classify a subject of the proposed image; and
using the classification to modify the indication of composition measure.

6. The method of claim 5, wherein the classification of the subject is one of a person's face, an animal, a landscape object, a primary object of interest, a building or a landmark.

7. The method of claim 1, further comprising presenting to the user a set of one or more examples images, wherein the example images are selected by an engine based on image-based characteristics of the proposed image or external context information for the image capturing device.

8. The method of claim 1, further comprising signals to the user of the image capturing device for changes that could improve the composition measure, including one or more of icons, arrows or indicators for some change, some indication that the image capturing device will automatically make the change, and/or some language indicator explaining suggestions to the user in a visual, audio and/or tactile display of the image capturing device.

9. An image capturing device comprising:
an image sensor configured to receive a proposed image;
a processor, coupled to the image sensor, wherein the processor is configured to determine a plurality of image-based characteristics in response to the proposed image, wherein the processor is configured to evaluate an indicia for the proposed image in response to the plurality of image-based characteristics, wherein the processor is configured to output an indication of the indicia to a user associated with the image capturing device, wherein evaluating the indicia for the proposed image includes taking into account external characteristics that are treated as independent of pixel color values of the proposed image, and wherein the external characteristics comprise distillations of factors from a training set of photographs, and wherein at least some plurality of the training set of photographs have associated therewith a rating and one of the external characteristics is an estimated measure of the rating that would be applied to the proposed image given the training set and their ratings;
a shutter portion, coupled to the processor, configured to direct capturing of a captured image with the image sensor, in response to an image capture signal from the user; and
a memory coupled to the image sensor, wherein the memory is configured to store the captured image in the memory.

10. A method for operating a computing device, the computing device including a processor, and a memory, the method comprising:
receiving a plurality of images from a user;
determining a respective plurality of image-based characteristics using the processor in response to the plurality of images;
evaluating a respective plurality of indicia for the plurality of images using the processor in response to the respective plurality of image-based characteristics, wherein evaluating the respective plurality of indicia for the plurality of images includes taking into account external characteristics that are treated as independent the pixel color values of the proposed image, and wherein the external characteristics comprise distillations of factors from a training set of photographs, and wherein at least some plurality of the training set of photographs have associated therewith a rating and one of the external characteristics is an estimated measure of the rating that would be applied to the proposed image given the training set and their ratings;
prioritizing the plurality of images into an image order in response to the respective plurality of indicia; and
outputting a representation of the plurality of images to the user in response to the image order.

* * * * *

UNITED STATES PATENT AND TRADEMARK OFFICE
CERTIFICATE OF CORRECTION

| | |
|---|---|
| PATENT NO. | : 8,508,622 B1 |
| APPLICATION NO. | : 13/008855 |
| DATED | : August 13, 2013 |
| INVENTOR(S) | : Josh Anon |

It is certified that error appears in the above-identified patent and that said Letters Patent is hereby corrected as shown below:

On the Title Page, Item (73) Assignee, please delete "Pixar, Emeryville, CA (US); Disney Enterprises, Inc., Burbank, CA (US)" and insert --Disney Enterprises, Inc., Burbank, CA (US)--

Signed and Sealed this
Twelfth Day of November, 2013

Teresa Stanek Rea
*Deputy Director of the United States Patent and Trademark Office*